United States Patent
Shida et al.

(10) Patent No.: US 11,188,066 B2
(45) Date of Patent: Nov. 30, 2021

(54) SERVICE MENU PRESENTATION SYSTEM, OPERATION PATTERN DISPLAY SYSTEM, SERVICE MENU PRESENTATION METHOD, AND PROGRAM

(71) Applicant: Mitsubishi Hitachi Power Systems, Ltd., Yokohama (JP)

(72) Inventors: Masato Shida, Yokohama (JP); Koji Imakita, Yokohama (JP); Akihisa Endo, Yokohama (JP); Toru Tanaka, Yokohama (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 139 days.

(21) Appl. No.: 16/645,111

(22) PCT Filed: Oct. 12, 2017

(86) PCT No.: PCT/JP2017/037022
§ 371 (c)(1),
(2) Date: Mar. 6, 2020

(87) PCT Pub. No.: WO2019/073577
PCT Pub. Date: Apr. 18, 2019

(65) Prior Publication Data
US 2020/0348637 A1 Nov. 5, 2020

(51) Int. Cl.
*G05B 23/02* (2006.01)
*G05B 19/042* (2006.01)
(Continued)

(52) U.S. Cl.
CPC ......... *G05B 23/024* (2013.01); *F01D 21/003* (2013.01); *G05B 19/042* (2013.01);
(Continued)

(58) Field of Classification Search
CPC ...... G06F 3/048; G06F 3/0481; G06F 3/0482; G06F 17/40; G08C 17/02; G08C 23/04;
(Continued)

(56) References Cited

U.S. PATENT DOCUMENTS 7,747,377 B2 * 6/2010 Nakata .................... F02D 41/40
701/103
8,242,894 B2 * 8/2012 Kutaragi ................ G08C 17/02
340/13.24

(Continued)

FOREIGN PATENT DOCUMENTS

| JP | 2004-340392 | 12/2004 |
|----|-------------|---------|
| WO | 2016/052339 | 4/2016 |

OTHER PUBLICATIONS

International Search Report dated Nov. 21, 2017 in corresponding International (PCT) Application No. PCT/JP2017/037022; with English Translation.

(Continued)

*Primary Examiner* — Crystal J Barnes-Bullock
(74) *Attorney, Agent, or Firm* — Wenderoth, Lind & Ponack, L.L.P.

(57) ABSTRACT

Provided is a service menu presentation system which: acquires operation data relating to an electric power generation plant; decides which operation pattern, from among a plurality of operation patterns set in advance in accordance with an output mode, is the basis for the operation being indicated by the operation data; calculates, on the basis of the operation data acquired in a certain period, an operation time with respect to each of the operation patterns in the period; determines, on the basis of an operation time ratio in the certain period, an in-period operation pattern of the certain period; and outputs a service menu corresponding to the in-period operation pattern that has been determined.

11 Claims, 7 Drawing Sheets

| ITEM NUMBER | OPERATION PATTERN | TYPE | SERVICE MENU |
|---|---|---|---|
| A1 | FULL LOAD OPERATION | UPGRADE | HEPA FILTER |
| A2 | FULL LOAD OPERATION | MAINTENANCE | INSPECTION AND CLEANING OF COMPRESSOR |
| ... | ... | ... | ... |
| B1 | PARTIAL LOAD OPERATION | MAINTENANCE | SUPPORT RING INSPECTION |
| ... | ... | ... | ... |
| C1 | GOVERNOR OPERATION | MAINTENANCE | INSPECTION OF LOCK NUT OF IGV ACTUATOR |
| C2 | GOVERNOR OPERATION | MAINTENANCE | INSPECTION OF BYPASS RING OF BYPASS VALVE |
| ... | ... | ... | ... |

(51) Int. Cl.
*F01D 21/00* (2006.01)
*H04N 1/00* (2006.01)
*G06F 17/40* (2006.01)
*G06F 3/0482* (2013.01)

(52) U.S. Cl.
CPC ............ *G06F 3/0482* (2013.01); *G06F 17/40* (2013.01); *H04N 1/00408* (2013.01); *F05D 2260/80* (2013.01); *G05B 2219/2639* (2013.01)

(58) Field of Classification Search
CPC ............ G08C 2201/20; G08C 2201/30; G08C 2201/70; G08C 2201/92; G08C 2201/93; G05B 19/042; G05B 23/024; G05B 2219/2639; F01D 21/003; F05D 2260/80; H04N 1/00408
See application file for complete search history.

(56) References Cited

U.S. PATENT DOCUMENTS

| | | | |
|---|---|---|---|
| 8,396,821 B2 | 3/2013 | Kuhns et al. | |
| 8,587,792 B2 * | 11/2013 | Kasamatsu | H04N 1/00307 |
| | | | 358/1.13 |
| 8,890,895 B2 * | 11/2014 | Kutaragi | G06T 15/20 |
| | | | 345/633 |
| 9,116,182 B2 | 8/2015 | Scelzi | |
| 9,483,781 B2 * | 11/2016 | O'Donnell | H04L 41/5009 |
| 10,055,093 B2 * | 8/2018 | Shim | G01C 21/36 |
| 10,685,596 B2 * | 6/2020 | Yen | H04N 7/0806 |
| 10,983,607 B2 * | 4/2021 | Kutaragi | G06F 3/0346 |
| 2011/0174926 A1 | 7/2011 | Margis et al. | |
| 2012/0290981 A1 * | 11/2012 | Uchida | G08C 23/04 |
| | | | 715/810 |
| 2018/0231968 A1 | 8/2018 | Endo et al. | |
| 2021/0200334 A1 * | 7/2021 | Kutaragi | G06F 3/04842 |

OTHER PUBLICATIONS

Written Opinion dated Nov. 21, 2017 in corresponding International (PCT) Application No. PCT/JP2017/037022; with English Translation.

* cited by examiner

| ITEM NUMBER | OPERATION PATTERN | TYPE | SERVICE MENU |
|---|---|---|---|
| A1 | FULL LOAD OPERATION | UPGRADE | HEPA FILTER |
| A2 | FULL LOAD OPERATION | MAINTENANCE | INSPECTION AND CLEANING OF COMPRESSOR |
| ... | ... | ... | ... |
| B1 | PARTIAL LOAD OPERATION | MAINTENANCE | SUPPORT RING INSPECTION |
| ... | ... | ... | ... |
| C1 | GOVERNOR OPERATION | MAINTENANCE | INSPECTION OF LOCK NUT OF IGV ACTUATOR |
| C2 | GOVERNOR OPERATION | MAINTENANCE | INSPECTION OF BYPASS RING OF BYPASS VALVE |
| ... | ... | ... | ... |

FIG. 9

START
S41 — CALCULATE OPERATION TIME FOR EACH LOAD BAND
S42 — CALCULATE THE NUMBER OF START-UP TIMES
S43 — DISPLAY IN-PERIOD OPERATION PATTERN
S44 — SELECT MARK
S45 — DISPLAY SERVICE MENU
END

FIG. 10

| OPERATION MODE CLASSIFICATION | | CLASSIFICATION CRITERIA | EXPECTED DAMAGE TYPE |
|---|---|---|---|
| A-1 | FULL LOAD OPERATION (PURE) | FULL LOAD OPERATION TIME IS 75% OR MORE OF ANNUAL OPERATION TIME | • DAMAGE OF HIGH-TEMPERATURE PARTS IS MOST SEVERE |
| A-2 | FULL LOAD OPERATION + PARTIAL LOAD OPERATION | FULL LOAD OPERATION TIME IS LESS THAN 75% OF ANNUAL OPERATION TIME and ANNUAL NUMBER OF START-UP TIMES IS 36 TIMES OR LESS | • DAMAGE OF HIGH-TEMPERATURE PARTS IS SEVERE |
| A-3 | FULL LOAD OPERATION + PARTIAL LOAD OPERATION + MULTIPLE START-UPS | FULL LOAD OPERATION TIME IS LESS THAN 75% OF ANNUAL OPERATION TIME and ANNUAL NUMBER OF START-UP TIMES IS 37 TIMES OR MORE | • DAMAGE OF HIGH-TEMPERATURE PARTS IS SEVERE<br>• DAMAGE DUE TO START-UP/SHUTDOWN IS SEVERE<br>• DAMAGE DUE TO TURNING ROTATION IS SEVERE |
| B-1 | PARTIAL LOAD OPERATION (HIGH LOAD BAND) | NINE OR MORE MONTHS PER YEAR IN WHICH AVERAGE LOAD RATE DURING DAYTIME IS 80% OR MORE, NINE OR MORE MONTHS PER YEAR IN WHICH AVERAGE LOAD RATE DURING NIGHTTIME IS 70% OR MORE, and ANNUAL NUMBER OF START-UP TIMES IS 36 TIMES OR LESS | • DAMAGE OF HIGH-TEMPERATURE PARTS IS SEVERE ACCORDING TO IGV OPENING |
| B-2 | PARTIAL LOAD OPERATION (HIGH LOAD BAND) + MULTIPLE START-UPS | (NINE OR MORE MONTHS PER YEAR IN WHICH AVERAGE LOAD RATE DURING DAYTIME IS 80% OR MORE, NINE OR MORE MONTHS PER YEAR IN WHICH AVERAGE LOAD RATE DURING NIGHTTIME IS 70% OR MORE), and ANNUAL NUMBER OF START-UP TIMES IS 37 TIMES OR MORE | • DAMAGE OF HIGH-TEMPERATURE PARTS IS SEVERE ACCORDING TO IGV OPENING<br>• DAMAGE DUE TO START-UP/SHUTDOWN IS SEVERE<br>• DAMAGE DUE TO TURNING ROTATION IS SEVERE |
| B-3 | PARTIAL LOAD OPERATION (LOW LOAD BAND) | (LESS THAN NINE MONTHS PER YEAR IN WHICH AVERAGE LOAD RATE DURING DAYTIME IS 80% OR MORE, or LESS THAN NINE MONTHS PER YEAR IN WHICH AVERAGE LOAD RATE DURING NIGHTTIME IS 70% OR MORE), and ANNUAL NUMBER OF START-UP TIMES IS 36 TIMES OR LESS | • HEAT DROP OCCURS IN A CASE WHERE RECIPROCATION AROUND RATED LOAD AND HALF LOAD INCREASES. |
| B-4 | PARTIAL LOAD OPERATION (LOW LOAD BAND) + MULTIPLE START-UPS | (LESS THAN NINE MONTHS PER YEAR IN WHICH AVERAGE LOAD RATE DURING DAYTIME IS 80% OR MORE, or LESS THAN NINE MONTHS PER YEAR IN WHICH AVERAGE LOAD RATE DURING NIGHTTIME IS 70% OR MORE), and ANNUAL NUMBER OF START-UP TIMES IS 37 TIMES OR MORE | • HEAT DROP OCCURS IN A CASE WHERE RECIPROCATION AROUND RATED LOAD AND HALF LOAD INCREASES.<br>• DAMAGE DUE TO START-UP/SHUTDOWN IS SEVERE<br>• DAMAGE DUE TO TURNING ROTATION IS SEVERE |
| C-1 | GOVERNOR OPERATION (HIGH LOAD BAND) | NINE OR MORE MONTHS PER YEAR IN WHICH AVERAGE LOAD RATE DURING DAYTIME IS 80% OR MORE, NINE OR MORE MONTHS PER YEAR IN WHICH AVERAGE LOAD RATE DURING NIGHTTIME IS 70% OR MORE, and ANNUAL NUMBER OF START-UP TIMES IS 36 TIMES OR LESS | • DAMAGE OF SLIDING PART SUCH AS IGV OR BYPASS VALVE IS SEVERE HIGH-TEMPERATURE PARTS ARE DAMAGED ACCORDING TO IGV OPENING |
| C-2 | GOVERNOR OPERATION (HIGH LOAD BAND) + MULTIPLE START-UPS | (NINE OR MORE MONTHS PER YEAR IN WHICH AVERAGE LOAD RATE DURING DAYTIME IS 80% OR MORE, NINE OR MORE MONTHS PER YEAR IN WHICH AVERAGE LOAD RATE DURING NIGHTTIME IS 70% OR MORE), and ANNUAL NUMBER OF START-UP TIMES IS 37 TIMES OR MORE | • DAMAGE OF SLIDING PART SUCH AS IGV OR BYPASS VALVE IS SEVERE HIGH-TEMPERATURE PARTS ARE DAMAGED ACCORDING TO IGV OPENING<br>• DAMAGE DUE TO START-UP/SHUTDOWN IS SEVERE<br>• DAMAGE DUE TO TURNING ROTATION IS SEVERE |
| C-3 | GOVERNOR OPERATION (LOW LOAD BAND) | (LESS THAN NINE MONTHS PER YEAR IN WHICH AVERAGE LOAD RATE DURING DAYTIME IS 80% OR MORE, or LESS THAN NINE MONTHS PER YEAR IN WHICH AVERAGE LOAD RATE DURING NIGHTTIME IS 70% OR MORE), and ANNUAL NUMBER OF START-UP TIMES IS 36 TIMES OR LESS | • DAMAGE OF SLIDING PART SUCH AS IGV OR BYPASS VALVE IS SEVERE |
| C-4 | GOVERNOR OPERATION (LOW LOAD BAND) + MULTIPLE START-UPS | (LESS THAN NINE MONTHS PER YEAR IN WHICH AVERAGE LOAD RATE DURING DAYTIME IS 80% OR MORE, or LESS THAN NINE MONTHS PER YEAR IN WHICH AVERAGE LOAD RATE DURING NIGHTTIME IS 70% OR MORE), and ANNUAL NUMBER OF START-UP TIMES IS 37 TIMES OR MORE | • DAMAGE OF SLIDING PART SUCH AS IGV OR BYPASS VALVE IS SEVERE<br>• DAMAGE DUE TO START-UP/SHUTDOWN IS SEVERE<br>• DAMAGE DUE TO TURNING ROTATION IS SEVERE |

FIG. 11

| ITEM NUMBER | TYPE | SERVICE MENU |
|---|---|---|
| 1 | MAINTENANCE | INSPECTION OF EXHAUST COMPARTMENT |
| 2 | MAINTENANCE | INSPECTION OF DAMAGE DUE TO LONG-TERM TURNING |
| ... | ... | ... |

FIG. 12

SERVICE MENU PRESENTATION SYSTEM, OPERATION PATTERN DISPLAY SYSTEM, SERVICE MENU PRESENTATION METHOD, AND PROGRAM

TECHNICAL FIELD

The present invention relates to a service menu presentation system, an operation pattern display system, a service menu presentation method, and a program.

BACKGROUND ART

In an apparatus such as a gas turbine installed in an electric power generation plant, deterioration of parts proceeds or damage occurs in accordance with an operation time or the number of start-up times of the apparatus. A part that is deteriorated or damaged is replaced with new one at the time of periodic inspection. Patent Literature 1 discloses a support apparatus that notifies support information for prompting inspection or replacement of a part that is deteriorated, for example. The support apparatus disclosed in Patent Literature 1 calculates an operation state of an electric power generation plant apparatus (for example, the number of start-up times) on the basis of sensing information acquired from the electric power generation plant apparatus, and compares the calculated operation state with a variety of threshold values to decide the degree of the operation state and to present support information based on the degree.

CITATION LIST

Patent Literature

[PTL 1] International Publication No. WO2016/052339

SUMMARY OF INVENTION

Technical Problem

However, in a case where actual inspection is performed, unexpected deterioration or damage may be found, in addition to inspection items selected in advance on the basis of an operation time, the number of start-up times, and the like. In a case where such deterioration or the like is found at the time of periodic inspection, it may take time to arrange replacement parts or replace parts. Accordingly, it is desirable to provide a method for providing information on items to be inspected from a viewpoint other than the operation state disclosed in PTL 1.

Accordingly, an object of the present invention is to provide a service menu presentation system, an operation pattern display system, a service menu presentation method, and a program capable of solving the above problems.

Solution to Problem

According to an aspect of the present invention, there is provided a service menu presentation system including: an operation data acquisition unit that acquires operation data of an electric power generation plant; an operation pattern decision unit that decides which operation pattern, among a plurality of operation patterns set in advance in accordance with output modes, shows an operation indicated by the operation data; an operation time calculation unit that calculates, on the basis of the operation data acquired in a certain period, an operation time for each of the operation patterns in the certain period; an in-period operation pattern determination unit that determines an in-period operation pattern that is an operation pattern representative in the certain period, on the basis of a ratio of the operation times of the respective operation patterns in the certain period; and a menu output unit that outputs a service menu corresponding to the determined in-period operation pattern.

According to the aspect of the present invention, the service menu presentation system may further comprise: an operation pattern output unit that outputs a triangle of which an apex is a point associated with each of the operation patterns together with a mark indicating the in-period operation pattern within the triangle.

According to the aspect of the present invention, in a case where a difference between operation times relating to two operation patterns among operation times of the respective operation patterns is within a predetermined range, the menu output unit may present a service menu according to the two operation patterns.

According to the aspect of the present invention, the menu output unit may present a service menu corresponding to the number of start-up times within the certain period in addition to the operation patterns.

According to the aspect of the present invention, the operation patterns may include a full load operation, a partial load operation, and a governor operation.

According to the aspect of the present invention, in a case where the in-period operation pattern is the partial load operation or the governor operation, the menu output unit may output the service menu in accordance with an output average.

According to the aspect of the present invention, the service menu presentation system may further comprise: an operation pattern prediction unit that predicts the in-period operation pattern within the certain period in the future on the basis of operation data in the past in the electric power generation plant.

According to the aspect of the present invention, the menu output unit may acquire a first service menu extracted on the basis of a predetermined monitoring item in the operation data and a threshold value determined for each of the monitoring items, and may preferentially output a service menu equivalent to the acquired first service menu from among the service menus corresponding to the in-period operation pattern.

According to another aspect of the present invention, there is provided an operation pattern display system including: an operation pattern output unit that outputs a mark indicating an in-period operation pattern that is an operation pattern representative in a certain period, determined on the basis of a ratio of the operation times of a plurality of operation patterns that are determined in advance in accordance with output modes, together with a triangle of which an apex is a point associated with the operation pattern, within the triangle.

According to still another aspect of the present invention, there is provided a service menu presentation method including: a step of acquiring operation data of an electric power generation plant; a step of deciding which operation pattern, among a plurality of operation patterns set in advance in accordance with output modes, shows an operation indicated by the operation data; a step of calculating, on the basis of the operation data acquired in a certain period, an operation time for each of the operation patterns in the certain period; a step of determining an in-period operation pattern that is an operation pattern representative in the certain period, on the basis of a ratio of the operation times of the respective operation patterns in the certain period; and a step of outputting a service menu corresponding to the determined in-period operation pattern.

According to still another aspect of the present invention, there is provided a program causing a computer to execute an operation data acquisition process of acquiring operation data of an electric power generation plant; an operation pattern decision process of deciding which operation pattern, among a plurality of operation patterns set in advance in accordance with output modes, shows an operation indicated by the operation data; an operation time calculation process of calculating, on the basis of the operation data acquired in a certain period, an operation time for each of the operation patterns in the certain period; an in-period operation pattern determination process of determining an in-period operation pattern that is an operation pattern representative in the certain period on the basis of a ratio of the operation times of the respective operation patterns in the certain period; and a menu output process of outputting a service menu corresponding to the determined in-period operation pattern.

Advantageous Effects of Invention

According to the service menu presentation system and service menu presentation method, it is possible to recognize locations where deterioration or damage easily occurs on the basis of an operation pattern of an electric power generation plant. Further, according to the operation pattern display system, it is possible to recognize the operation pattern of the electric power generation plant that becomes the basis for estimating the occurrence of deterioration or damage.

BRIEF DESCRIPTION OF DRAWINGS

FIG. 10 is a diagram showing an example of operation modes according to an embodiment of the present invention.

DESCRIPTION OF EMBODIMENTS

Embodiment

Hereinafter, a service menu presentation system according to an embodiment of the present invention will be described with reference to FIGS. 1 to 12.

Figure 1:
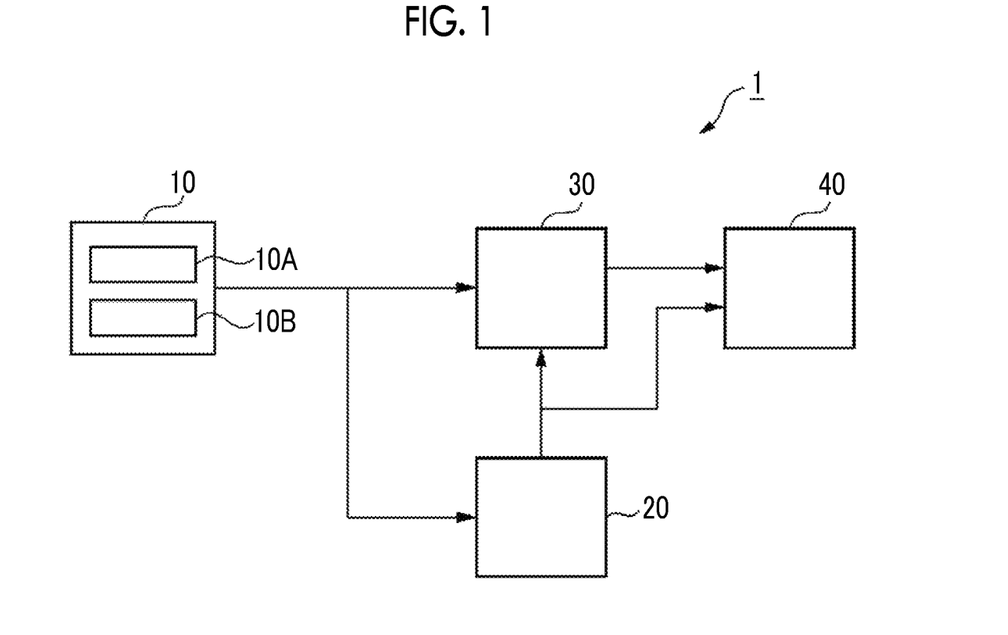
FIG. 1 is a block diagram schematically showing an example of an operation support system according to an embodiment of the present invention.

FIG. 1 is a schematic block diagram showing an example of an operation support system according to an embodiment of the present invention. An operation support system 1 is a system that presents a service menu related to maintenance management to a maintenance management staff who performs maintenance management of a plant 10 and a plan thereof. The service menu is, for example, information indicating options for maintenance management items such as a location to be inspected, a location where degradation or damage is predicted, or an effective countermeasure against degradation or damage (for example, introduction of upgrade parts), for an apparatus provided with the plant 10.

As shown in the figure, the operation support system 1 includes the plant 10, an operation support apparatus 20, a service menu presentation apparatus 30, and a maintenance management terminal 40. The service menu presentation apparatus 30 is communicably connected to each of the plant 10, the operation support apparatus 20, and the maintenance management terminal 40. Further, the operation support apparatus 20 is communicably connected to each of the plant 10, the service menu presentation apparatus 30, and the maintenance management terminal 40.

The plant 10 is an electric power generation plant provided with a gas turbine, for example. In the plant 10, plant equipment necessary for power generation, for example, gas turbines 10A and 10B are installed. The plant 10 transmits operation data of the gas turbines 10A and 10B to the operation support apparatus 20 and the service menu presentation apparatus 30. The operation data includes various control signals (signals for instructing operation patterns, valve opening degree command signals, or the like) to be output to the gas turbines 10A and 10B by a control device (not shown), measurement values measured by various sensors that are provided in the gas turbine 10A or the like, and values calculated on the basis of the measurement values (temperature, pressure, output, rotation speed, or the like).

The operation support apparatus 20 compares values of monitoring items based on the operation data received from the plant 10 (gas turbines 10A and 10B) with various threshold values, decides an operation state of the gas turbine 10A or the like, and presents support information corresponding to the operation state. For example, the operation support apparatus 20 calculates a compressor efficiency using temperatures of an inlet and an outlet of a compressor, a cabin pressure, and the like, included in the operation data. In a case where the calculated compressor efficiency is a value outside a range defined by a predetermined threshold value, the operation support apparatus 20 decides that vanes of the compressor are in an operation state where cleaning is necessary. The operation support apparatus 20 transmits support information for prompting the cleaning of the vanes to the service menu presentation apparatus 30 and the maintenance management terminal 40. The support information includes a service menu corresponding to the operation state.

While the operation support apparatus 20 outputs the support information based on the operation state, the service menu presentation apparatus 30 decides an operation pattern of the gas turbine 10A or the like on the basis of the operation data received from the plant 10, and selects a service menu corresponding to the operation pattern. The service menu presentation apparatus 30 may use the support information acquired from the operation support apparatus 20 for selecting the service menu. The service menu presentation apparatus 30 transmits the selected service menu to the maintenance management terminal 40.

The maintenance management terminal 40 is an information processing device such as a personal computer (PC), a mobile terminal, or the like, used by a maintenance management staff. The maintenance management terminal 40 outputs the service menu acquired from the service menu presentation apparatus 30 and the support information acquired from the operation support apparatus 20, and displays the results on a display device. The maintenance management staff plans inspection items for periodic inspection with reference to the service menu output from the maintenance management terminal 40, or presents the service menu output from the maintenance management terminal 40 to a user of the plant 10 to explain details of the periodic inspection.

Figure 2:
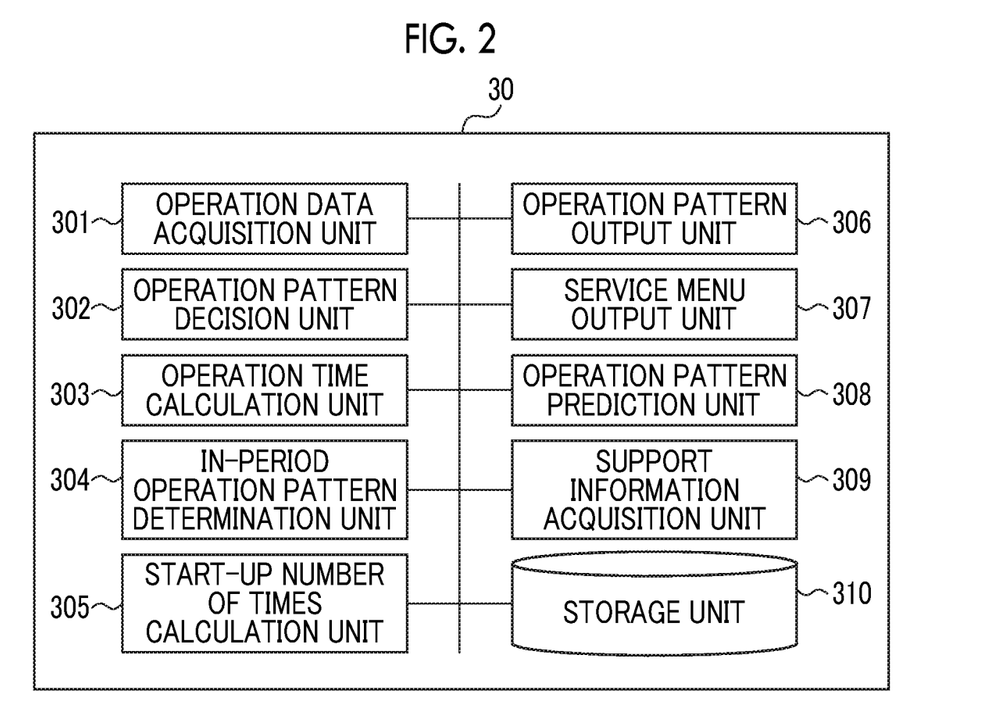
FIG. 2 is a functional block diagram showing an example of a service menu presentation apparatus according to an embodiment of the present invention.

FIG. 2 is a functional block diagram showing an example of a service menu presentation apparatus according to an embodiment of the present invention. As shown in FIG. 2, the service menu presentation apparatus 30 includes an operation data acquisition unit 301, an operation pattern decision unit 302, an operation time calculation unit 303, an in-period operation pattern determination unit 304, and a start-up number of times calculation unit 305, an operation pattern output unit 306, a service menu output unit 307, an operation pattern prediction unit 308, a support information acquisition unit 309, and a storage unit 310. The service menu presentation apparatus 30 is configured by a computer such as one or a plurality of server terminals.

The operation data acquisition unit 301 acquires operation data transmitted from the plant 10, and records the operation data in the storage unit 310. On the basis of a control signal at each time point recorded in the operation data, the operation pattern decision unit 302 decides an operation pattern at a predetermined time starting from that time point. For example, the operation data includes a control signal for instructing an operation pattern of the gas turbine 10A every minute. The gas turbine 10A performs operation for one minute at the operation pattern instructed by the control signal.

Here, the operation pattern and the control signal will be described. The operation pattern refers to an operation method corresponding to a role which the plant 10 gives to each of the gas turbines 10A and 10B in order to stably supply an appropriate amount of electric power. The operation pattern includes, for example, a full load operation, a partial load operation, a governor operation in accordance with output modes. The full load operation is an operation pattern given to a gas turbine that is in charge of generation of most of electric power supplied by the plant 10. In the full load operation, a control for keeping an exhaust gas temperature from the gas turbine at a target value is performed. In a case where the gas turbine is operated at a full load in a certain time slot, a control signal for instructing the full load operation every minute is recorded in operation data at the time slot. The partial load operation is an operation pattern given to a gas turbine that is in charge of generation of electric power for fluctuations in the power supplied from the plant 10. In the partial load operation, a control for keeping an output from the gas turbine at a target value is performed. In a case where the gas turbine is operated at a partial load in a certain time slot, a control signal for instructing the partial load operation every minute is recorded in operation data at the time slot. The governor operation is an operation pattern given to a gas turbine that functions to stabilize the frequency of electric power supplied by the plant 10, for example. In the governor operation, a control for keeping a rotation speed of the gas turbine at a target value is performed. In a case where the gas turbine is governor-operated in a certain time slot, a control signal for instructing the governor operation every minute is recorded in operation data at the time slot.

The operation pattern decision unit 302 decides whether the operation pattern at each time is the full load operation, the partial load operation, or the governor operation on the basis of the control signal recorded in the operation data.

The operation time calculation unit 303 collects operation data using the decision result by the operation pattern decision unit 302, and calculates an operation time for each operation pattern in a certain period. For example, in a case where, with respect to 10-minute operation data recorded every minute, control signals of the full load operation are recorded at five time points, control signals of the partial load operation are recorded at three time points, and control signals of the governor operation are recorded at two time points, the operation time calculation unit 303 calculates the operation time of each operation pattern as 5 minutes for the full load operation, 3 minutes for the partial load operation, and 2 minutes for the governor operation. The operation time calculation unit 303 calculates the operation time for each operation pattern on the basis of operation data for one year, for example.

The in-period operation pattern determination unit 304 determines an in-period operation pattern, which is an operation pattern that represents a certain period, on the basis of the ratio of operation times of respective operation patterns in the certain period. For example, in a case where the ratio of operation times in one year (full load operation: partial load operation: governor operation) is 5:3:2, the in-period operation pattern determination unit 304 determines the full load operation as the in-period operation pattern in one year.

The start-up number of times calculation unit 305 calculates the number of start-up times of the gas turbines 10A and 10B on the basis of operation data.

The operation pattern output unit 306 outputs a triangle having an apex corresponding to each of operation patterns together with a predetermined mark indicating an in-period operation pattern within the triangle. The mark indicating the in-period operation pattern is output at a position representing the ratio of operation times of respective operation patterns in the triangle. The triangle and the mark will be described later.

The service menu output unit 307 outputs a service menu corresponding to an in-period operation pattern. For example, in a case where the in-period operation pattern is the full load operation, the service menu output unit 307 selects and outputs a service menu that is set to be associated with the full load operation from among the service menus that are associated with the respective operation patterns. The service menu includes maintenance management items, recommended update items, and the like for dealing with places where there is a high possibility of deterioration or damage due to the full load operation.

The operation pattern prediction unit 308 predicts an in-period operation pattern within a certain period in the future on the basis of past operation data.

The support information acquisition unit 309 acquires support information from the operation support apparatus 20. The support information includes values of predetermined monitoring items based on operation data (in the above example, the temperatures of the outlet and the inlet of the compressor, the compressor efficiency based on the cabin pressure), and service menus extracted on the basis of threshold values determined for each monitoring item (in the above example, the service menu for cleaning the vanes). The service menu output unit 307 selects a service menu based on the in-period operation pattern by adding details of the support information acquired from the operation support apparatus 20 to selection factors.

The storage unit 310 stores a variety of information such as operation data acquired by the operation data acquisition unit 301 or a service menu for each operation pattern.

Figure 3:
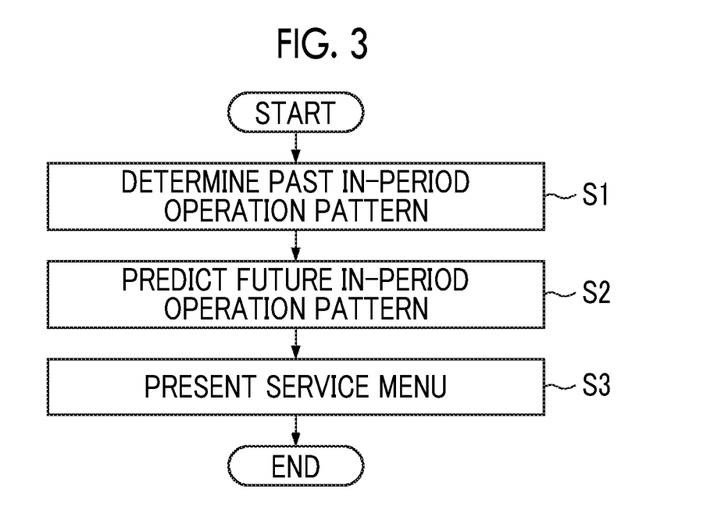
FIG. 3 is a flowchart showing an example of processes performed by the service menu presentation apparatus according to the embodiment of the present invention.

Next, a service menu presentation process will be described. First, an overall processing flow will be described with reference to FIG. 3. FIG. 3 is a first flowchart showing an example of processes performed by the service menu presentation apparatus according to the embodiment of the present invention.

First, the service menu presentation apparatus 30 acquires operation data for one year to a plurality of years in the past, and determines an in-period operation pattern for each year (step S1). The service menu presentation apparatus 30 outputs the in-period operation pattern every year.

Then, the service menu presentation apparatus 30 predicts an operation time of each future operation pattern on the basis of the past operation data, and predicts a future in-period operation pattern (step S2). Then, the service menu presentation apparatus 30 presents a service menu corresponding to the in-period operation pattern (step S3). For example, the service menu presentation apparatus 30 presents a service menu such as inspection places and replacement parts to be performed at the next periodic inspection on the basis of the in-period operation pattern based on the operation data for the most recent year, or presents a necessary service menu in the next year or the year after next, on the basis of the prediction of the in-period operation pattern.

Next, an in-period operation pattern determination process and a display process will be described.

Figure 4:
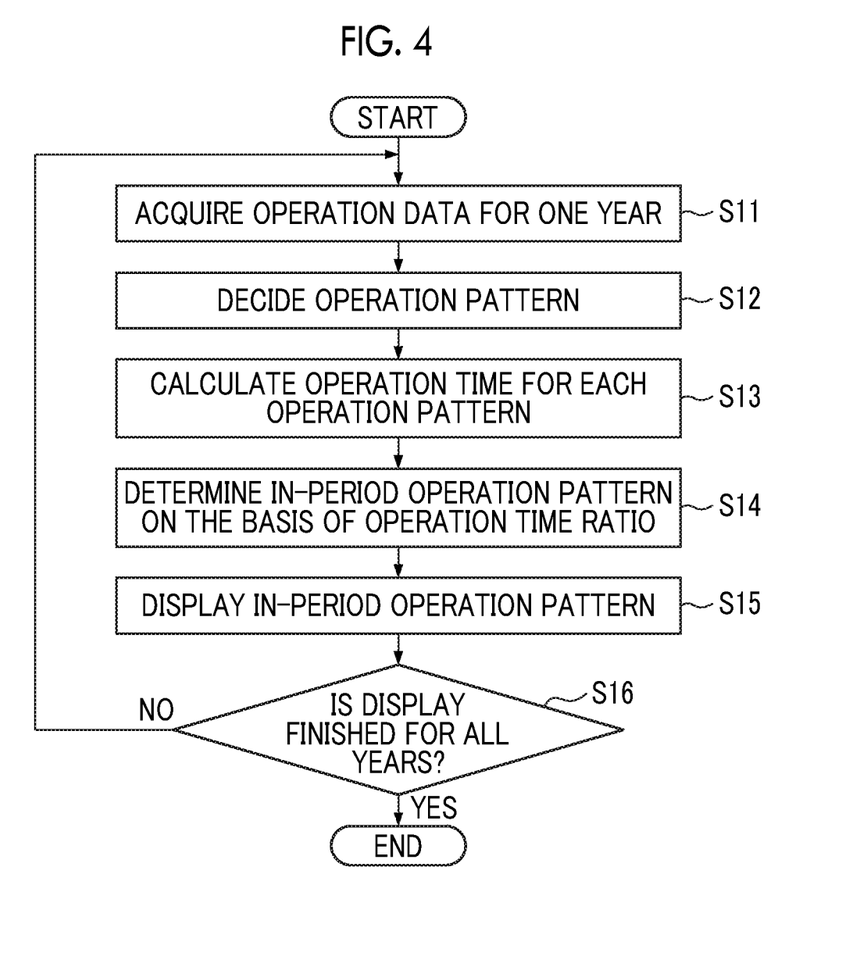
FIG. 4 is a flowchart showing an example of an in-period operation pattern determination process according to an embodiment of the present invention.

FIG. 4 is a flowchart showing an example of an in-period operation pattern determination process according to an embodiment of the present invention.

As an example, a case where operation data for the past 8 years of the gas turbine 10A is recorded in the storage unit 310 and an in-period operation pattern is determined for each year in the 8 years will be described. First, the operation data acquisition unit 301 acquires operation data for one year (for example, 8 years ago) out of the past 8 years (step S11). The operation data acquisition unit 301 outputs the operation data to the operation pattern decision unit 302. Then, the operation pattern decision unit 302 decides an operation pattern (the full load operation, the partial load operation, or the governor operation) every predetermined time (for example, every minute) on the basis of control signals recorded in the operation data (step S12). The operation pattern decision unit 302 records the decided operation pattern in the storage unit 310 in association with the control signal at each time point recorded in the operation data. Then, the operation time calculation unit 303 calculates the operation time for each operation pattern (step S13). For example, the operation time calculation unit 303 collects the operation patterns associated with the operation data, multiplies the collected operation patterns by a control signal recording interval (for example, 1 minute) to calculate the operation time at which the gas turbine 10A is operating in each operation pattern. Through the above-described processes, the operation time (Tc) based on the full load operation, the operation time (Tb) based on the partial load operation, and the operation time (Ta) based on the governor operation are calculated.

Then, the in-period operation pattern determination unit 304 calculates an operation time ratio Tc:Tb:Ta according to the respective operation patterns, and determines an operation pattern with the highest ratio as the in-period operation pattern (step S14). For example, in a case where Tc:Tb:Ta is calculated as c [%]:b [%]:a [%] (a+b+c=100 [%]), and c:b:a is 16:62:22, the in-period operation pattern determination unit 304 determines the in-period operation pattern of the gas turbine 10A of this year as the partial load operation. This means that the operation pattern of the gas turbine 10A eight years ago was dominated by the partial load operation. For example, even in a case where the total operation time is the same length of time (T1), there is a difference in degradation or damage between the case of operation for T1 by the full load operation and the case of operation for T1 by the partial load operation. In this embodiment, in order to present a service menu in consideration of effects of deterioration or damage due to the operation patterns, a dominant operation pattern in a certain period (in-period operation pattern) is determined on the basis of the ratio of operation times based on the respective operation patterns.

Then, the operation pattern output unit 306 displays the determined in-period operation pattern (step S15). A specific display example will be described with reference to FIG. 5. Then, the operation pattern output unit 306 decides whether or not the display is completed for all years (eight years) (step S16), and the processes from step S11 are repeated in a case where there is a year for which the display is not performed.

Figure 5:
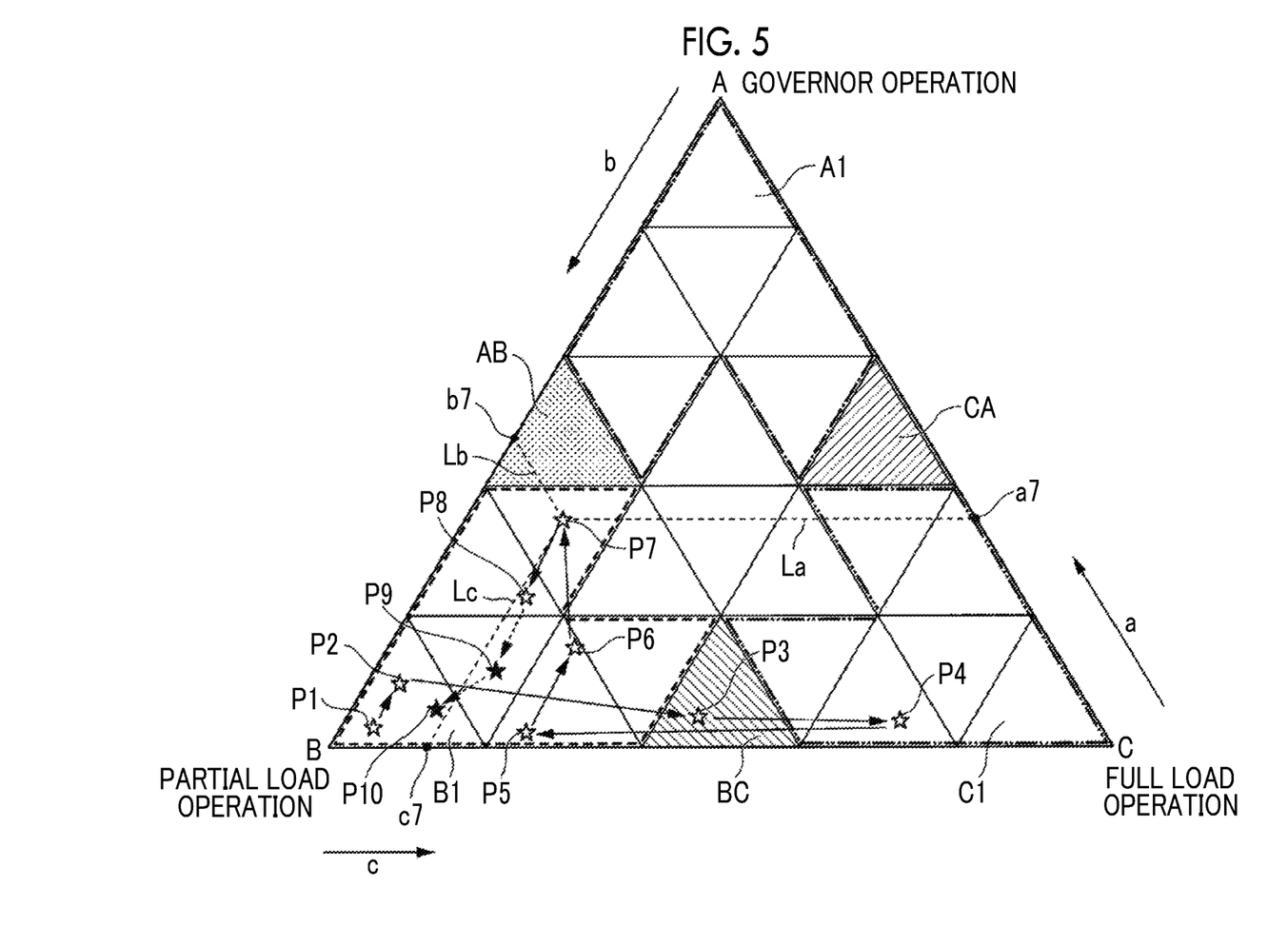
FIG. 5 is a diagram showing a display example of an in-period operation pattern according to an embodiment of the present invention.

Next, a display example of an in-period operation pattern by the operation pattern output unit 306 will be described. FIG. 5 is a diagram showing a display example of an in-period operation pattern according to an embodiment of the present invention.

The operation pattern output unit 306 displays a triangle in which apexes A to C are associated with operation patterns as shown in the figure, and displays star marks P1 to P8 indicating in-period operation patterns in the triangle. The apex A is associated with the governor operation, the apex B is associated with the partial load operation, and the apex C is associated with the full load operation. Further, the mark P1 shows an in-period operation pattern for one year eight years ago, the mark P2 shows an in-period operation pattern for one year seven years ago, . . . , and the mark P8 shows an in-period operation pattern for the last year, respectively. The same applies to the marks P3 to P7.

The triangle in FIG. 5 is a graph represented by a coordinate system in which each apex is a reference, and a line from the apex A to the apex B, a line from the apex B to the apex C, and a line from the apex C to the apex A are coordinate axes, respectively (hereinafter, referred to as a triangular coordinate graph). For example, the mark P1 is displayed at a position of coordinates (b1, c1, a1) on the basis of the ratio (c1[%]:b1[%]:a1 [%]) of the respective operation patterns eight years ago. Here, the first value "b1" of the coordinates (b1, c1, a1) indicates a position b1 at the ratio of b1 from the apex A on a side AB. The second value "c1" indicates a position c1 at the ratio of c1 from the apex B on a side BC. The third value "a1" indicates a position a1 at the ratio of a1 from the apex C on a side CA. The operation pattern output unit 306 displays the mark P1 at an intersection of three auxiliary lines in a case where the auxiliary lines are drawn in parallel with the sides (the side BC, the side CA, and the side AB, respectively) including apexes (apex C, apex A, and apex B, respectively) that serve as a reference for each of the positions a1, b1, and c1 among the sides other than a side where, in each of the positions a1, b1, and c1 specified as described above, the specified position exists. FIG. 5 shows auxiliary lines La, Lb, and Lc drawn with respect to the mark P7. The auxiliary line Lb is an auxiliary line drawn in parallel with the side CA including the apex A that serves as a reference for the point b7 among the sides (side BC and side CA) other than the side AB from the point b7 (position at the ratio of b7 from the apex A on the side AB). Similarly, the auxiliary line Lc is an auxiliary line drawn from the point c7 in parallel with the side AB. The auxiliary line La is an auxiliary line drawn from the point a7 in parallel with the side BC. The operation pattern output unit 306 displays the mark P7 at an intersection of the auxiliary lines La, Lb, and Lc.

The positions where the marks P1 to P8 are displayed indicate the tendency of the operation pattern for each year. That is, each mark indicates that the operation time according to the operation pattern corresponding to each apex is long in the order of the apexes close to the display position. The operation pattern corresponding to the closest apex is the in-period operation pattern. In this way, by displaying the marks for each year using the triangular coordinate graph, a maintenance management staff can recognize an in-period operation pattern, and can also recognize a tendency of an operation pattern of a certain year (for example, even in a case where the in-period operation pattern is the partial load operation, whether most of the total operation time is occupied by operation under the partial load operation or whether the operation time of the partial load operation is the longest but the operation time of the governor operation is long). Thus, the maintenance management staff can propose inspection items and the like in consideration of the operation pattern tendency to a user.

Further, according to the triangular coordinate graph, the maintenance management staff can recognize transition of the operation pattern by displaying marks of a plurality of years. For example, in the case of the example of FIG. 5, in the gas turbine 10A, the partial load operation is overwhelmingly dominant eight years ago, and the operation time of the governor operation is slightly increased seven years ago. Six years ago, the full load operation is increased to the same extent as the partial load operation, and the full load operation is the most dominant operation pattern five years ago. After that, for example, it can be seen that the partial load operation is a main operation. Thus, the maintenance management staff can propose the inspection items and the like in consideration of the transition of the operation pattern to the user.

In this embodiment, the inside of the triangular coordinate graph is divided into an area A1 (area surrounded by a single-dot chain line) indicating that the governor operation is dominant, an area B1 (area surrounded by a broken line) indicating that the partial load operation is dominant, an area C1 (area surrounded by a two-dot chain line) indicating that the full load operation is dominant, an area AB indicating that the governor operation and the partial load operation are dominant to the same extent, an area BC indicating that the partial load operation and the full load operation are dominant to the same extent, and an area CA indicating that the full load operation and the governor operation are dominant to the same extent. Further, for example, regarding the marks P1 and P7, the partial load operation is dominant in those years, and it is considered that there is a high possibility that deterioration and damage inherent in the partial load operation occur in these years. Regarding the mark P3, both the partial load operation and the full load operation are dominant in this year, and it is considered that there is a high possibility that both deterioration and damage inherent in the partial load operation and deterioration and damage inherent in the full load operation occur. As will be described later, in this embodiment, on the basis of the consideration, a service menu is presented in accordance with an area in which a mark indicating an in-period operation pattern is displayed. The operation pattern output unit 306 displays and visualizes in-period operation patterns that affect deterioration and damage that occur in the gas turbine 10A and the like in areas corresponding to the respective operation patterns in the triangular coordinate graph.

Next, an in-period operation pattern prediction process in which an in-period operation pattern is predicted by a T method (1) will be described as an example.

Figure 6:
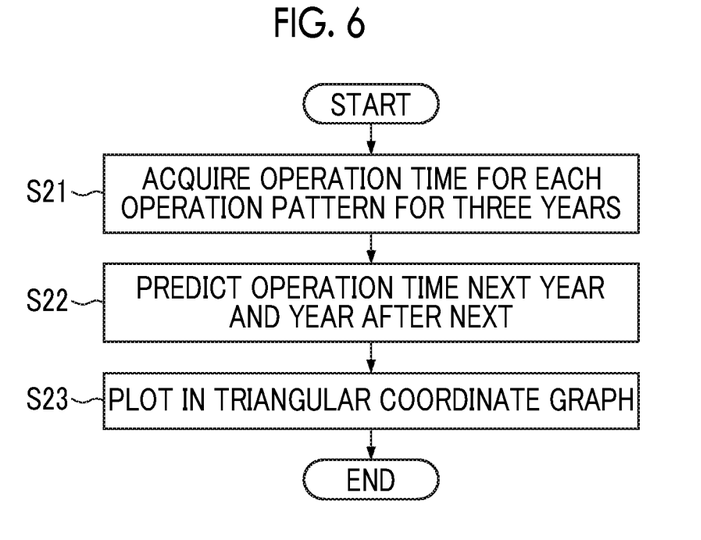
FIG. 6 is a flowchart showing an example of an in-period operation pattern prediction process according to an embodiment of the present invention.

FIG. 6 is a flowchart showing an example of an in-period operation pattern prediction process according to an embodiment of the present invention.

First, the operation data acquisition unit 301 acquires an operation time for each operation pattern based on operation data for the last three years (step S21). In the case of FIG. 5, the operation time for each operation pattern is acquired for the years of the marks P6 to P8. The operation time for each operation pattern has been calculated in a case where the triangular coordinate graph is created. Then, the operation pattern prediction unit 308 predicts the operation times in the next year and the year after next (step S22). For example, the operation pattern prediction unit 308 sets data on the operation time for each operation pattern two years ago as unit space data, and sets data on the operation time for each operation pattern one year ago and three years ago as unit space data, respectively. Further, a proportional constant $\beta$, an SN ratio $\eta$, an effective divisor r, an overall estimation value M, and the like of signal data are calculated using the known T method (1), and the operation time (unknown data) for each operation pattern of the next year is estimated. Similarly, the operation pattern prediction unit 308 sets the operation time for each operation pattern one year ago as unit space data, and sets the operation time for each operation pattern two years ago and the operation time for each estimated operation pattern for the next year as signal data, respectively, to estimate the operation time for each operation pattern for the year after next.

The operation pattern prediction unit 308 outputs the estimated data of the next year and the year after next to the in-period operation pattern determination unit 304. The in-period operation pattern determination unit 304 determines in-period operation patterns for the next year and the year after next on the basis of the estimated data in the next year and the year after next. Then, the operation pattern output unit 306 displays the in-period operation patterns for the next year and the year after next in the triangular coordinate graph (step S23). FIG. 5 shows an example of in-period operation patterns estimated by the operation pattern prediction unit 308. A mark P9 is an in-period operation pattern for the next year, and a mark P10 is an in-period operation pattern for the year after next.

In this way, by estimating an operation time for each operation pattern in the future on the basis of the operation time for each operation pattern indicated by the past operation data, it is possible to predict a future in-period operation pattern, and to visualize transition of the in-period operation pattern from the past period to the future period. Thus, it is possible to predict parts and inspection places where there is a possibility that deterioration or failure may occur several years ago. It is important for the user who operates the plant 10 to suppress a loss profit due to an unexpected shutdown or to reduce an inspection cost. In a case where parts having a high possibility of deterioration or failure can be predicted and the shutdown of the gas turbine 10A can be prevented beforehand by maintenance, such a loss profit can be suppressed. Further, in a case where it is possible to systematically prepare places where there is a high possibility of failure to be included in inspection items for future periodic inspection in advance, the user can secure a budget necessary for the inspection and parts replacement, or to make a long-term operation plan without waste, thereby leading to cost reduction.

The operation time prediction method is not limited to the T method (1). For example, prediction may be performed by multiple regression analysis or extrapolation.

Next, on the assumption that the processes described in FIG. 4 have been executed, a service menu presentation process based on an in-period operation pattern will be described with reference to FIGS. 7 to 10.

Figure 7:
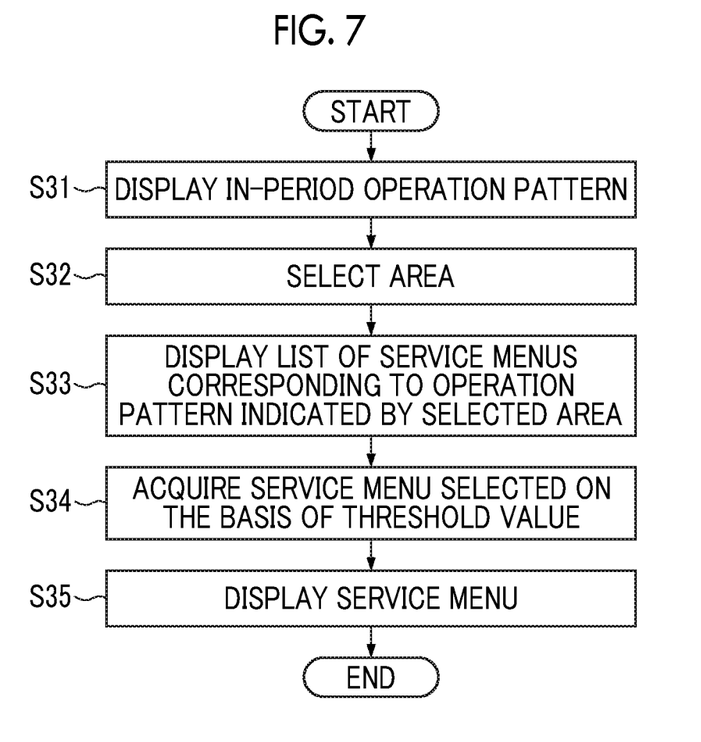
FIG. 7 is a first flowchart showing an example of a service menu presentation process according to an embodiment of the present invention.

FIG. 7 is a first flowchart showing an example of a service menu presentation process according to an embodiment of the present invention.

First, the operation pattern output unit 306 displays a mark indicating an in-period operation pattern on a triangular coordinate graph (step S31). Then, a maintenance management staff selects any one of the areas A1, B1, C1, AB, BC, and CA (step S32). For example, the maintenance management staff performs selection by performing a click operation or a tap operation on an area where in-period operation patterns of recent one year are displayed.

Figure 8:
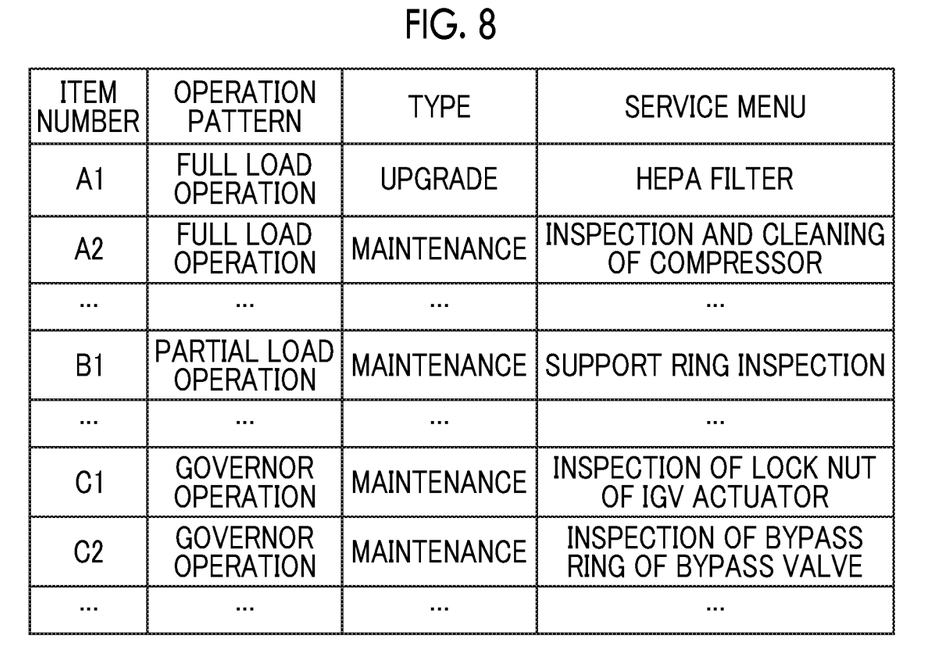
FIG. 8 is a first diagram showing an example of a service menu according to an embodiment of the present invention.

Then, the service menu output unit 307 reads out a list of service menus corresponding to the selected area from the storage unit 310, and displays the result on the display device (step S33). FIG. 8 shows an example of a table in which service menus recorded in the storage unit 310 are registered. FIG. 8 is a first diagram showing an example of a service menu according to an embodiment of the present invention. The table illustrated in FIG. 8 has respective items of "item number", "operation pattern", "type", and "service menu". In "item number", service menu identification information is stored. In "operation pattern", any of "the full load operation", "the partial load operation", and "the governor operation" is stored. In "type", the type of a service menu is stored. Specifically, any one of upgrade and maintenance is stored. The upgrade is a service menu that recommends upgrading a part where deterioration or failure is likely to occur according to an in-period operation pattern to a part where deterioration or failure is unlikely to occur. The maintenance is a service menu that recommends inspection of a part where deterioration or failure is likely to occur according to an in-period operation pattern or replacement of the part. In "service menu", a specific service menu is stored.

An example of a service menu in a case where an in-period operation pattern is the full load operation may include a high efficiency particulate air (HEPA) filter. The HEPA filter is attached to a suction side of the compressor of the gas turbine 10A, and is introduced so as not to take in harmful substances (dust, sand, oil mist, or the like) that cause deterioration of the gas turbine 10A. In the full load operation, the flow rate of intake air becomes large in order to maintain a high output, and dirt easily adheres to the vanes of the compressor. This causes reduction in the efficiency and reliability of the compressor and a shutdown for cleaning. The HEPA filter is recommended as an upgrade part to prevent the above-mentioned problems (item number A1).

Similarly, an example of maintenance in the case of the full load operation may include inspection and cleaning of the compressor. As described above, in the full load operation, the flow rate of the intake air is large, so that the compressor vanes are particularly easily contaminated. As a result, for example, the efficiency of the compressor is reduced. In a case where the vanes of the compressor become dirty, the vanes need to be cleaned. Accordingly, it is recommended to inspect and clean the compressor (item number A2).

An example of a service menu in a case where an in-period operation pattern is the partial load operation may include inspection of a support ring. A first stage of a stator vane of a turbine of the gas turbine 10A is placed in the harshest use environment among rotor-stator vanes of the turbine. For example, in the case of the partial load operation, since a turbine inlet temperature greatly fluctuates, the burden on the first stage of the stator vane becomes heavy. The support ring adjacent to the first stage of the stator vane is also exposed to inflow of high temperature gas, which results in high temperature oxidation and thinning. Accordingly, it is recommended to perform the inspection of the support ring (item number B1).

An example of a service menu in a case where an in-period operation pattern is the governor operation may include inspection of a lock nut of an inlet guide vane (IGV) actuator or inspection of a bypass ring of a bypass valve provided in a tail sleeve of a combustor. In the governor operation, there are many cases where a sliding part of the IGV or the bypass valve is damaged. For the IGV actuator, it is recommended to perform maintenance for checking whether the lock nut is loosened and retightening the lock nut as necessary (item number C1). In the case of the bypass ring, it is recommended to perform maintenance for confirming whether or not wear has progressed and repairing a place where the wear has progressed (item number C2). As described above, in the storage unit 310, a list of service menus to be recommended for each operation pattern is recorded. The service menu output unit 307 reads out all service menus related to an in-period operation pattern from the storage unit 310.

Then, the support information acquisition unit 309 acquires support information from the operation support apparatus 20 (step S34). The support information includes a support menu in which an operation state is selected on the basis of a threshold value. For example, in a case where the efficiency of the compressor of the gas turbine 10A is lower than a threshold value, the operation support apparatus 20 transmits support information (a first service menu) for recommending cleaning of the compressor to the service menu presentation apparatus 30. The support information transmitted by the operation support apparatus 20 is not related to an operation pattern of the gas turbine 10A. That is, even in a case where the in-period operation pattern of the gas turbine 10A is an operation pattern in which "cleaning of the compressor" is not registered in the service menu table shown in FIG. 8 (even in the case of the partial load operation or the governor operation), if the compressor efficiency is lower than the threshold value, support information for recommending "cleaning of the compressor" is transmitted.

Then, the service menu output unit 307 displays a service menu (step S35). In this case, the service menu output unit 307 selects the service menu by adding the support information acquired from the operation support apparatus 20 to selection factors. For example, in a case where the in-period operation pattern is the full load operation and the service information including "cleaning of the compressor" is acquired from the operation support apparatus 20, the service menu output unit 307 reads out a service menu such as "HEPA filter" or "cleaning of the compressor" related to the full load operation from the storage unit 310. The service menu output unit 307 preferentially outputs "cleaning of the compressor" on the basis of the fact that "cleaning of the compressor" acquired from the operation support apparatus 20 is included in the read-out service menu. For example, the service menu output unit 307 may display "cleaning of the compressor" at the top, may display "cleaning of the compressor" in the most outstanding form, or may display the fact that "cleaning of the compressor" is a service menu selected from each viewpoint of the operation pattern and the operation state and is the most recommended service menu.

On the other hand, in a case where the in-period operation pattern is the partial load operation or the governor operation and the service information including "cleaning of the compressor" is acquired from the operation support apparatus 20, the service menu output unit 307 reads out a service menu related to the partial load operation or the governor operation from the storage unit 310, and displays the read-out service menu together with "cleaning of the compressor". For example, the service menu output unit 307 displays the fact that the service menu based on the operation pattern is "inspection of the support ring", the service menu based on the operation state is "cleaning of the compressor", or the like.

Further, in a case where the in-period operation pattern is any one of the areas AB, BC, and CA, the service menu output unit 307 displays service menus related to two operation patterns. In a case where the in-period operation pattern is the area AB, the service menu output unit 307 displays "HEPA filter", "cleaning of the compressor", or the like associated with the full load operation, together with "inspection of the support ring", or the like associated with the partial load operation. The reason why the service menus related to the two operation patterns are displayed is because, in an intermediate area where a difference between operation times regarding the two operation patterns is within a predetermined range, a damage form that is not related to the two operation patterns and is specific to the intermediate area is not confirmed. In this case, similarly, in a case where the support information "cleaning of the compressor" is acquired from the operation support apparatus 20, "cleaning of the compressor" is preferentially displayed.

Conventionally, inspection items in periodic inspection or the like have been frequently determined without considering differences such as deterioration caused by operation patterns of the gas turbines 10A and 10B. According to this embodiment, by recognizing a tendency of an operation pattern and further predicting the operation pattern in the future, it is possible to additionally inspect a service menu (important inspection location, replacement parts, or the like) based on the most dominant operation pattern (in-period operation pattern). As a result, it is possible to recognize in advance a portion that is suspected of deterioration, which cannot be detected only by an operation state, and to perform periodic inspection smoothly through preparation of inspection and replacement of parts. Further, it is possible to secure trust from a user.

It is possible to notify in advance the user of the plant 10 of points to be focused on at the next periodic inspection and its reason, and thus, it becomes easier for the user to understand the periodic inspection, which easily leads to proposition of parts replacement and upgrade parts.

In a case where inspection items are selected on the basis of support information from the operation support apparatus 20, the number of items becomes large, and it may be difficult to know which one to select. According to this embodiment, it is possible to set items in which support information and a service menu based on an in-period operation pattern match each other as important inspection items, and thus, it is possible to enhance convenience in planning periodic inspection.

Next, another example of a service menu presentation process will be described with reference to FIGS. 9 to 11.

Figure 9:
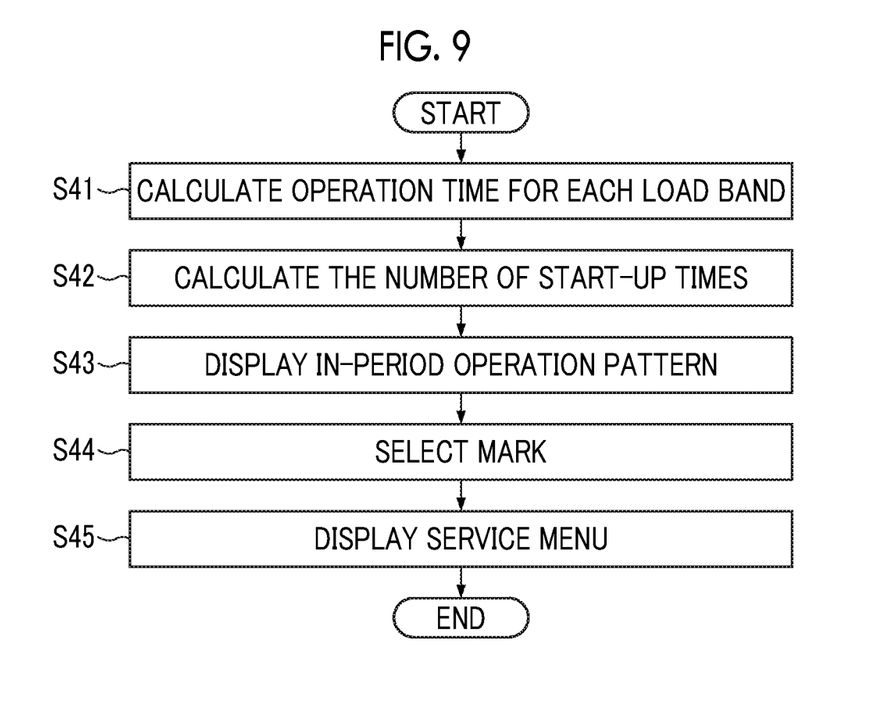
FIG. 9 is a second flowchart showing an example of the service menu presentation process according to the embodiment of the present invention.

FIG. 9 is a second flowchart showing an example of a service menu presentation process according to an embodiment of the present invention.

As a premise, it is assumed that steps up to step S14 in the processes described in FIG. 4 have been executed. That is, the operation time calculation unit 303 calculates an operation time for each operation pattern, and the in-period operation pattern determination unit 304 determines an in-period operation pattern. Then, the operation time calculation unit 303 calculates an operation time for each load band with respect to the in-period operation pattern (step S41). The calculation of the operation time for each load band will be described.

In a case where the in-period operation pattern is the full load operation, the operation time calculation unit 303 calculates the degree of an operation time during operation at the full load operation in an annual operation time. For example, in a case where a control signal instructing the full load operation is recorded as 80% of control signals per minute recorded in operation data, the operation time calculation unit 303 calculates that the full load operation time is 80% of an annual operation time. The operation time calculation unit 303 determines whether the full load operation time is 75% or more of the annual operation time.

In a case where the in-period operation pattern is the partial load operation or the governor operation, the operation time calculation unit 303 calculates average load rates during daytime and at night. In the operation data, the magnitude of an output of the gas turbine 10A or the like is recorded, and the operation time calculation unit 303 divides the output value of the operation data by a rated output to calculate the degree of a load (load rate) at each time. The operation time calculation unit 303 calculates a load rate for each time, and calculates an average value for each of daytime and nighttime. Further, the operation time calculation unit 303 decides whether or not there are nine or more months in which the average load rate is 80% or more in a year, with respect to the daytime load rate. In addition, the operation time calculation unit 303 decides whether or not there are nine or more months in which the average load rate is 75% or more in a year, with respect to the night load rate.

The operation time calculation unit 303 outputs the decision results to the service menu output unit 307 in association with the year and an in-period operation pattern of the year.

Then, the start-up number of times calculation unit 305 calculates the number of start-up times for one year (step S42). For example, in the operation data, a history of outputs of a control signal for instructing start-up and stop of the gas turbine 10A is recorded, and the start-up number of times calculation unit 305 counts control signals for instructing start-up from the operation data for one year to calculate the number of start-up times. The start-up number of times calculation unit 305 outputs the number of start-up times for each year to the service menu output unit 307.

Then, the operation pattern output unit 306 displays a mark indicating the in-period operation pattern on a triangular coordinate graph (step S43). This process is the same as step S15 in FIG. 4. Then, the maintenance management staff selects a mark of a year for which a service menu is to be displayed (step S44). For example, the maintenance management staff selects the mark P8 (FIG. 5) indicating the in-period operation pattern of recent one year in order to plan the next periodic inspection by the click operation, the tap operation, or the like.

Then, the service menu output unit 307 displays a service menu according to the in-period operation pattern, a load band, and the number of start-up times (step S45). The operation method classified by the in-period operation pattern, the load band, and the number of start-up times is referred to as an operation mode. FIG. 10 shows an example of the operation mode.

FIG. 10 is a diagram showing an example of operation modes according to an embodiment of the present invention. As shown in the figure, the operation modes are classified depending on whether there are many operations in a high load band, many operations in a low load band, and many or few start-ups, for each in-period operation pattern. The reason for this classification is because even in the same in-period operation pattern, there are differences in locations where deterioration or damage progresses depending on the high load, the low load, and the number of start-ups. The service menu output unit 307 decides which of the operation modes illustrated in FIG. 10 is executed, on the basis of the decision result and the number of start-up times acquired in steps S41 and S42.

For example, in the case of the full load operation, classification is performed according to whether or not the operation time at the full load operation is 75% or more of the total operation time, and in the case of less than 75%, the operation mode is classified according to whether the number of start-up times is 36 times or more per year. In a case where the operation time of the full load operation is 75% or more (operation mode "A-1"), it is considered that damage of high-temperature parts (turbine vanes and stator vanes, split rings, and the like) are the most severe. For example, in the table illustrated in FIG. 8, in addition to the in-period operation pattern, the service menu is classified for each operation mode, and in a case where the decided operation mode is "A-1", the service menu output unit 307 reads out and outputs the service menu for proposing upgrade or maintenance for high-temperature parts associated with the operation mode "A-1" from the table. In a case where the operation time of the full load operation is less than 75%, similarly, it is considered that damage of the high-temperature parts is also severe, and thus, the service menu output unit 307 outputs the service menu for the high-temperature parts. Further, in a case where the number of start-up times is large, damage due to start-up/shutdown and damage due to turning rotation increase. In a case where the operation mode is "A-3", the service menu output unit 307 outputs a service menu for damage caused by start-up/shutdown and turning rotation, in addition to the service menu for the high-temperature parts. An example of a service menu corresponding to the number of start-up times will be described later.

In the case of the partial load operation, in a case where there are 9 months or more per year in which a daytime load factor is 80% or more, there are 9 months or more per year in which a nighttime load factor is 70% or more, and the number of start-up times is 36 times or less, the operation mode is classified as "B-1: partial load operation (high load band)". In a case where the same load factor conditions during day and night are satisfied and the number of start-up times is 37 times or more, the operation mode is classified as "B-2: partial load operation (high load band)+multiple start-ups". Hereinafter, with respect to the low load band, similarly, classification is performed as "B-3: partial load operation (low load band)" and "B-4: partial load operation (low load band)+multiple start-ups" in accordance with the average load factor during day and night and the number of start-up times. Even in a case where the in-period operation pattern is the partial load operation, in a case where the operation time in the high load band becomes longer, the high-temperature parts are damaged. On the other hand, in a case where the operation time in the low load band increases, for example, a significant heat change occurs due to reciprocation around the rated load and around a half load, and damage due to a heat drop easily occurs. In both the high load band and the low load band, similarly, in a case where the number of start-up times increases, damage caused by start-up/shutdown and the like increases. Service menus are recorded in the storage unit 310 in association with the operation modes "B-1" to "B-4" having different properties as described above, and the service menu output unit 307 outputs the service menus corresponding to the operation modes "B-1" to "B-4".

Similarly, in the case of the governor operation, in a case where there are 9 months or more per year in which the daytime load factor is 80% or more, and there are 9 months or more per year in which the nighttime load factor is 70% or more, and the number of start-up times is 36 times or less, the operation mode is classified as "C-1: governor operation (high load band)". In a case where the same load factor conditions during day and night are satisfied and the number of start-up times is 37 times or more, the operation mode is classified as "C-2: governor operation (high load band)+ multiple start-ups". Similarly, with respect to the low load band, classification is performed as "C-3: governor operation (low load band)" and "C-4: governor operation (low load band)+multiple start-ups" in accordance with the average load factor during day and night and the number of start-up times. In a case where the in-period operation pattern is the governor operation, damage of sliding parts such as the IGV and the bypass valve becomes severe as described above. In a case where the operation time in the high load band becomes longer, there is a higher possibility that the high-temperature parts may be damaged. The increase in the number of start-up times is as described above. The service menu output unit 307 outputs service menus corresponding to the operation modes "C-1" to "C-4" of the governor operation.

Next, a service menu corresponding to the number of start-up times will be described.

Figure 11:
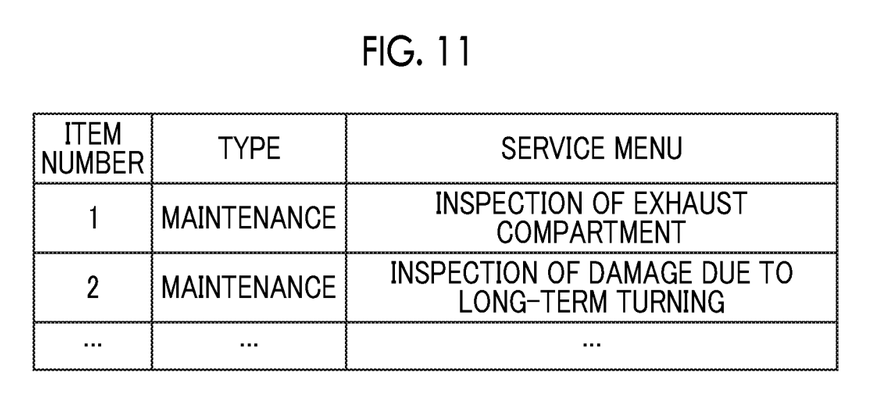
FIG. 11 is a second diagram showing an example of a service menu according to the embodiment of the present invention.

FIG. 11 is a second diagram showing an example of a service menu according to the embodiment of the present invention.

A table illustrated in FIG. 11 is recorded in the storage unit 310. In the table, "service menu" for damage that easily occurs in a case where the number of start-up times is large is stored. In "item number", service menu identification information is stored. In "type", a type (upgrade and maintenance) of a service menu is stored. In "service menu", a specific service menu is stored. For example, an exhaust compartment is exposed to severe thermal stress. Particularly, in a case where start-up and shutdown of the gas turbine 10A and the like are repeated, cracks easily occur in a welded portion (damage due to start-up and shutdown). Accordingly, in a case where the number of start-up times is large, a service menu "inspection of exhaust compartment" is stored to check the state of the exhaust compartment and prompt to perform welding repair in a case where a crack has occurred.

Further, in a case where the turning rotation is performed for a long time, wear of vane grooves of a turbine disk progresses and a seal pin is dropped, or a seal panel of a turbine rotor vane is rattled due to wear. In the compressor, there is a possibility that a first stage vane stopper of a rotor vane is worn and the position of a first stage rotor vane is moved. Generally, as the start-up/shutdown number of times increases, a no-load operation time becomes longer. As the no-load operation time increases, damage due to turning rotation increases. Accordingly, in a case where the number of start-up times is large, a service menu "inspection for damage due to long-term turning" is stored, which prompts inspection of the state of wear of turbine disk vane grooves, the seal panel, the first stage vane stopper of the rotor vane of the compressor, or the like.

In a case where the operation mode is "A-3", "B-2", "B-4", "C-2", or "C-4", in addition to the service menu based on the load band, the service menu output unit 307 outputs a service menu corresponding to the number of start-up times.

In this way, by displaying the service menu based on the operation mode in which the in-period operation pattern is subdivided from the viewpoint of the operation load band and the number of start-up times, it is possible to estimate a damage location or the like in more detail on the basis of the operation mode. As a result, in a case where a location or a part that may be deteriorated or damaged is prepared before periodic inspection, it is possible to enhance the accuracy of the preparation and to perform the periodic inspection more smoothly.

In the case of the processes shown in the flowchart of FIG. 9, similarly, support information may be acquired from the operation support apparatus 20 and the service menu may be displayed in consideration of the support information.

In a case where the in-period operation pattern is an intermediate area such as the area AB, the operation mode may be classified on the basis of what percentage of the operation time in each operation pattern is operated in the high load band.

In FIG. 3, the in-period operation pattern in the future is predicted, but this step may not be performed, and only step S1 and step S3 may be performed.

Figure 12:
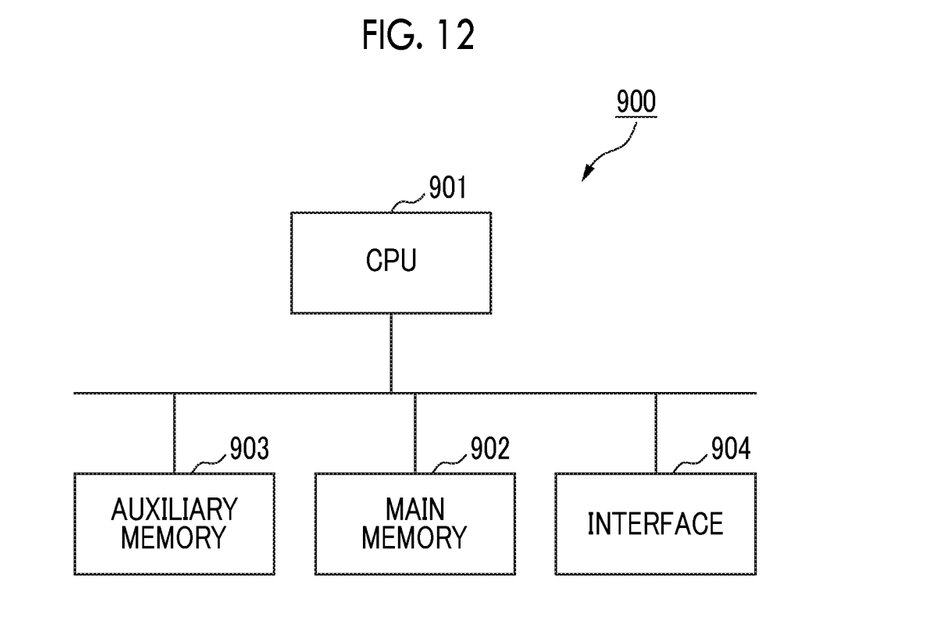
FIG. 12 is a diagram showing an example of a hardware configuration of the service menu presentation apparatus according to the embodiment of the present invention.

FIG. 12 is a diagram showing an example of a hardware configuration of the service menu presentation apparatus according to the embodiment of the present invention.

A computer 900 includes a CPU 901, a main memory 902, an auxiliary memory 903, and an interface 904.

The above-described service menu presentation apparatus 30 includes the computer 900. Further, the operations of the above-described respective processing units are stored in the auxiliary memory 903 in the form of a program. The CPU 901 reads out the program from the auxiliary memory 903, develops the result into the main memory 902, and executes the processes in accordance with the program. Further, the CPU 901 secures a storage area corresponding to the above-described storage unit 310 in the main memory 902 in accordance with the program.

In at least one embodiment, the auxiliary memory 903 is an example of a tangible medium that is not temporary. Other examples of the tangible medium that is not temporary include a magnetic disc, a magneto-optical disc, an optical disc, a semiconductor memory, or the like, connected through the interface 904. Further, in a case where the program is distributed to the computer 900 by a communication line, the computer 900 that has received the distribution may develop the program into the main memory 902 and may execute the above processes.

Further, the program may realize a part of the above-mentioned functions. In addition, the program may be a so-called differential file (differential program) that realizes the above-described functions in combination with another program already stored in the auxiliary memory 903.

Further, the components in the above-described embodiments may be appropriately replaced with known components without departing from the concept of the present invention. In addition, the technical scope of the present invention is not limited to the above-described embodiments, and various modifications may be made without departing from the concept of the present invention. For example, the in-period operation pattern may be used as an operation pattern display system that outputs a triangular coordinate graph using a part of the functions of the service menu presentation apparatus 30. The service menu presentation apparatus 30 is an example of the service menu presentation system.

INDUSTRIAL APPLICABILITY

According to the service menu presentation system and service menu presentation method, it is possible to recognize locations where deterioration or damage easily occurs on the basis of an operation pattern of an electric power generation plant. Further, according to the operation pattern display system, it is possible to recognize the operation pattern of the electric power generation plant that becomes the basis for estimating the occurrence of deterioration or damage.

REFERENCE SIGNS LIST

1: operation support system
10: plant
10A, 10B: gas turbine
20: operation support apparatus
30: service menu presentation apparatus
301: operation data acquisition unit
302: operation pattern decision unit
303: operation time calculation unit
304: in-period operation pattern determination unit
305: start-up number of times calculation unit
306: operation pattern output unit
307: service menu output unit
308: operation pattern prediction unit
309: support information acquisition unit
310: storage unit
40: maintenance management terminal

The invention claimed is:
1. A service menu presentation system comprising:
an operation data acquisition unit that acquires operation data of an electric power generation plant;
an operation pattern decision unit that decides which operation pattern, among a plurality of operation patterns set in advance in accordance with output modes, shows an operation indicated by the operation data;

an operation time calculation unit that calculates, on the basis of the operation data acquired in a certain period, an operation time for each of the operation patterns in the certain period;

an in-period operation pattern determination unit that determines an in-period operation pattern that is an operation pattern representative in the certain period, on the basis of a ratio of the operation times of the respective operation patterns in the certain period; and a menu output unit that outputs a service menu corresponding to the determined in-period operation pattern.

2. The service menu presentation system according to claim 1, further comprising:

an operation pattern output unit that outputs a triangle of which an apex is a point associated with each of the operation patterns together with a mark indicating the in-period operation pattern within the triangle.

3. The service menu presentation system according to claim 1, wherein, in a case where a difference between operation times relating to two operation patterns among operation times of the respective operation patterns is within a predetermined range, the menu output unit presents a service menu according to the two operation patterns.

4. The service menu presentation system according to claim 1, wherein the menu output unit presents a service menu corresponding to the number of start-up times within the certain period in addition to the operation patterns.

5. The service menu presentation system according to claim 1, wherein the operation patterns include a full load operation, a partial load operation, and a governor operation.

6. The service menu presentation system according to claim 5, wherein in a case where the in-period operation pattern is the partial load operation or the governor operation, the menu output unit outputs the service menu in accordance with an output average.

7. The service menu presentation system according to claim 1, further comprising:

an operation pattern prediction unit that predicts the in-period operation pattern within the certain period in the future on the basis of operation data in the past in the electric power generation plant.

8. The service menu presentation system according to claim 1, wherein the menu output unit acquires a first service menu extracted on the basis of a predetermined monitoring item in the operation data and a threshold value determined for each of the monitoring items, and preferentially outputs a service menu equivalent to the acquired first service menu from among the service menus corresponding to the in-period operation pattern.

9. An operation pattern display system comprising:

an operation pattern output unit that outputs a mark indicating an in-period operation pattern that is an operation pattern representative in a certain period, determined on the basis of a ratio of the operation times of a plurality of operation patterns that are determined in advance in accordance with output modes, together with a triangle of which an apex is a point associated with the operation pattern, within the triangle.

10. A service menu presentation method comprising:

a step of acquiring operation data of an electric power generation plant;

a step of deciding which operation pattern, among a plurality of operation patterns set in advance in accordance with output modes, shows an operation indicated by the operation data;

a step of calculating, on the basis of the operation data acquired in a certain period, an operation time for each of the operation patterns in the certain period;

a step of determining an in-period operation pattern that is an operation pattern representative in the certain period, on the basis of a ratio of the operation times of the respective operation patterns in the certain period; and a step of outputting a service menu corresponding to the determined in-period operation pattern.

11. A non-transitory computer-readable medium storing a program, wherein said program causing a computer to execute:

an operation data acquisition process of acquiring operation data of an electric power generation plant;

an operation pattern decision process of deciding which operation pattern, among a plurality of operation patterns set in advance in accordance with output modes, shows an operation indicated by the operation data;

an operation time calculation process of calculating, on the basis of the operation data acquired in a certain period, an operation time for each of the operation patterns in the certain period;

an in-period operation pattern determination process of determining an in-period operation pattern that is an operation pattern representative in the certain period, on the basis of a ratio of the operation times of the respective operation patterns in the certain period; and a menu output process of outputting a service menu corresponding to the determined in-period operation pattern.

* * * * *